United States Patent

Moir et al.

[19]

[11] Patent Number: 5,917,677
[45] Date of Patent: Jun. 29, 1999

[54] DISK DRIVE MOTOR SPINDLE HUB ASSEMBLY WITH SEPARATELY FORMED HUB CERAMIC FLANGE ATTACHMENT

[75] Inventors: Michael Bruce Moir, Newbury Park; Richard Gene Krum, Thousand Oaks, both of Calif.

[73] Assignee: Seagate Technology, Inc., Scotts Valley, Calif.

[21] Appl. No.: 08/643,915

[22] Filed: May 7, 1996

Related U.S. Application Data

[60] Provisional application No. 60/008,750, Dec. 18, 1995.

[51] Int. Cl.⁶ .......................... G11B 23/03; G11B 17/038
[52] U.S. Cl. .................................... 360/99.12; 360/98.08; 369/270
[58] Field of Search ............................. 360/98.08, 99.12; 369/270

[56] References Cited

U.S. PATENT DOCUMENTS

| | | | |
|---|---|---|---|
| 4,205,357 | 5/1980 | Barton et al. | 360/98.08 |
| 4,224,648 | 9/1980 | Roling | 360/98.08 |
| 4,717,977 | 1/1988 | Brown | 360/98.08 |
| 4,814,652 | 3/1989 | Wright | 360/98.08 |
| 4,945,432 | 7/1990 | Matsudaira et al. | 360/98.08 |
| 5,101,306 | 3/1992 | Johnson | 360/99.12 |
| 5,136,450 | 8/1992 | Moir | 360/98.08 |
| 5,216,304 | 6/1993 | Ohta | 360/98.08 |
| 5,315,463 | 5/1994 | Dew et al. | 360/98.08 |
| 5,436,775 | 7/1995 | Ishimatsu | 360/99.12 |
| 5,457,589 | 10/1995 | Leuthold et al. | 360/98.08 |
| 5,490,022 | 2/1996 | Hoshina et al. | 360/99.12 |
| 5,504,638 | 4/1996 | Kinoshita et al. | 360/99.12 |
| 5,550,687 | 8/1996 | Suzuki | 360/99.12 |
| 5,659,443 | 8/1997 | Berberich | 360/98.06 |

FOREIGN PATENT DOCUMENTS

| | | | |
|---|---|---|---|
| 61-148667 | 7/1986 | Japan | 360/98.08 |
| 2-226566 | 9/1990 | Japan | 360/99.12 |
| 3-263650 | 11/1991 | Japan | 360/98.08 |
| 6-162709 | 6/1994 | Japan . | |
| 6-168536 | 6/1994 | Japan . | |
| 7-098912 | 4/1995 | Japan . | |
| 7-169181 | 7/1995 | Japan . | |

*Primary Examiner*—Craig A. Renner
*Attorney, Agent, or Firm*—Edward P. Heller, III; Raghunath S. Minisandram

[57] ABSTRACT

A disk drive motor spindle hub rotatable about a central shaft has a ceramic hub flange attached to a cylindrical hub portion. The ceramic hub flange has a peripherally raised area on which a first disc rests. Additional discs and spacers are alternatively stacked on top of the first disc. The spacers are made of ceramic material with an inner relieved portion. A ceramic clamp washer with peripherally raised area and an inner relieved portion is stacked on top of the first disc. A ceramic clamp washer with a peripherally raised area and an inner relieved portion and a clamp spring in cooperation with the hub flange apply force to hold the first disc and additional discs in place. The clamp force is applied away from the inner diameter of the discs while portions near the inner diameter of the discs are isolated from the hub flange, spacer and the clamp washer. A conductive centering sleeve exerts a radial force and connects the first disc and additional discs to the hub portion positioning them concentric and providing a conductive path to ground.

28 Claims, 4 Drawing Sheets

DISK DRIVE MOTOR SPINDLE HUB ASSEMBLY WITH SEPARATELY FORMED HUB CERAMIC FLANGE ATTACHMENT

This application claims the benefit of provisional application Ser. No. 60/008,750 filed on Dec. 18, 1995, entitled Disc Clamp and Spacer.

BACKGROUND OF THE INVENTION

The present invention relates generally to the field of disc drive data storage devices and, more particularly, to an assembly of spindle motor and disc stack.

Disc drive data storage devices, known as "Winchester" type disc drives, are well known in the industry. In a Winchester disc drive, digital data are written to and read from a thin layer of magnetizable material on the surface of rotating discs. Write and read operations are performed through a transducer which is carried in a slider body. The slider and transducer are sometimes collectively referred to as a head, and typically a single head is associated with each disc surface. The heads are selectively moved under the control of electronic circuitry to any one of a plurality of circular, concentric data tracks on the disc surface by an actuator device. Each slider body includes a self-acting hydrodynamic air bearing surface. As the disc rotates, the disc drags air beneath the air bearing surface, which develops a lifting force that causes the slider to lift and fly several microinches above the disc surface.

In the current generation of disc drive products, the most commonly used type of actuator is a rotary moving coil actuator. The discs themselves are typically mounted in a "stack" on the hub structure of a brushless DC spindle motor. For example, the U.S. Pat. No. 5,089,922 issued to Steven P. LeClair and assigned to Seagate Technology, Inc., discloses a disc drive motor spindle hub for holding a disc and spacer stack firmly in place, the teachings of which are fully incorporated herein by reference. This patent teaches an improved disc flange design which accommodates for the bending of the disc flange, yet allowing for maximum clamp force to be applied to the disc stack away from the cylindrical hub.

The prior art disc flange and disc spacers are machined parts, with a roughness of the order of 30–40 microinches. The discs are typically made up of aluminum substrates and have a stamped circular inner hole to accommodate the spindle hub. Due to the stamping process, the disc surface in the vicinity of the inner hole will have uneven projections. Any residual distortion of the disc inside diameter that may exist after the stamping process can adversely affect the surface condition of the entire disc after clamping into a disc and spacer stack as that surface is forced down against another component like the disc flange or the disc spacers or clamp washer.

The disc spacers are typically made up of aluminum alloy and are continuously dinged, nicked and scratched due to handling after manufacture and prior to assembly in a disc and spacer stack. Similarly, the metallic clamp washers are also susceptible for handling damages prior to assembly.

As the flying height of the slider above the disc continues to come down, there is a need to minimize the inherent roughness of components that makeup a disc stack so that the heads can be safely flown across the disc surface while reducing the flying height.

There is also a need to minimize the impact of roughness imparted due to the stamping of the circular inner hole of the disc.

There is also a need to use a disc flange whose surface roughness is significantly less than 30–40 microinches and resists bending due to clamp force. There is also a need to apply majority of the clamping force away from the disc inner diameter.

There is also a need to use various components that make up a spindle motor and disc stack assembly like, hub flange, disc spacers and clamp washers whose surface roughness is significantly less than 30–40 microinches and whose change in surface roughness due to handling damages do not adversely impact the disc stack. Also, there is a need to consider alternate non-metallic materials like ceramic for these components while overcoming any adverse effects like electrostatic charge buildup.

SUMMARY OF THE INVENTION

It is the object of this invention to use components like hub flange, disc spacers and clamp washer made of ceramic material so that a surface roughness of less than 30–40 microinches could be achieved. While handling damages to a metallic component could cause bumps which can adversely affect a disc and spacer stack, components made of ceramic material can only chip due to handling damages which do not adversely affect the disc and spacer stack. Further, by having raised portions or relieved portions at appropriate locations of the hub flange, disc spacer and clamp washer, the effect of residual distortion of the stamped inner diameter of the disc can be eliminated by preventing the distorted portions of the disc from touching the hub flange, disc spacer and clamp washer. Further, by having peripherally raised surface, majority of the clamp force can be applied away from the inner diameter of the discs.

The present invention provides a disc drive spindle hub having a ceramic hub flange upon which discs and spacers are stacked alternatively to form a disc and spacer stack. The ceramic hub flange has a peripherally raised area upon which the disc rests. The hub flange further having a recess near the middle so that the stamped inner portion of the disc is prevented from touching the hub flange. A clamp washer along with a clamp spring hold the disc stack while applying a clamp load to the disc stack.

In an alternate embodiment of the invention, the spacers used in the disc stack are of ceramic material. The spacers further having the corners of the inner diameter relieved so that the spacers are prevented from touching the stamped inner portion of the disc.

In yet another embodiment of the invention, the clamp washers are made of ceramic material. The outer periphery of the clamp washer having a raised surface so that clamping force is applied away from the inner diameter of the disc. Further, the inner portion of the clamp washer is relieved so that the clamp washer is prevented from touching the stamped inner portion of the disc.

In all embodiments of the invention, a conductive centering sleeve is inserted between the discs and the spindle hub so that any buildup of electrostatic charge due to the use of components made of ceramic material can be minimized or avoided by providing an electrically conductive path between the discs and the spindle hub, while maintaining the spindle hub at ground potential.

DETAILED DESCRIPTIONS

As is generally known in the art, the illustrative disc drive unit 10 includes a head positioner assembly (not shown) mounted within the housing 16 at a position along the disc stack. The head positioner assembly supports a plurality of individual arms having electro-magnetic heads at the distal ends there of in close proximity with respective upper and lower surfaces on the disks. A suitable actuator motor (not shown) such as a movable coil DC motor, and a corresponding motor controller function to displace the head through generally radial traverses relative to the discs, for example first disc 46 and second disc 50, for the purposes of reading and writing data, all in a well known manner.

Figure 1:
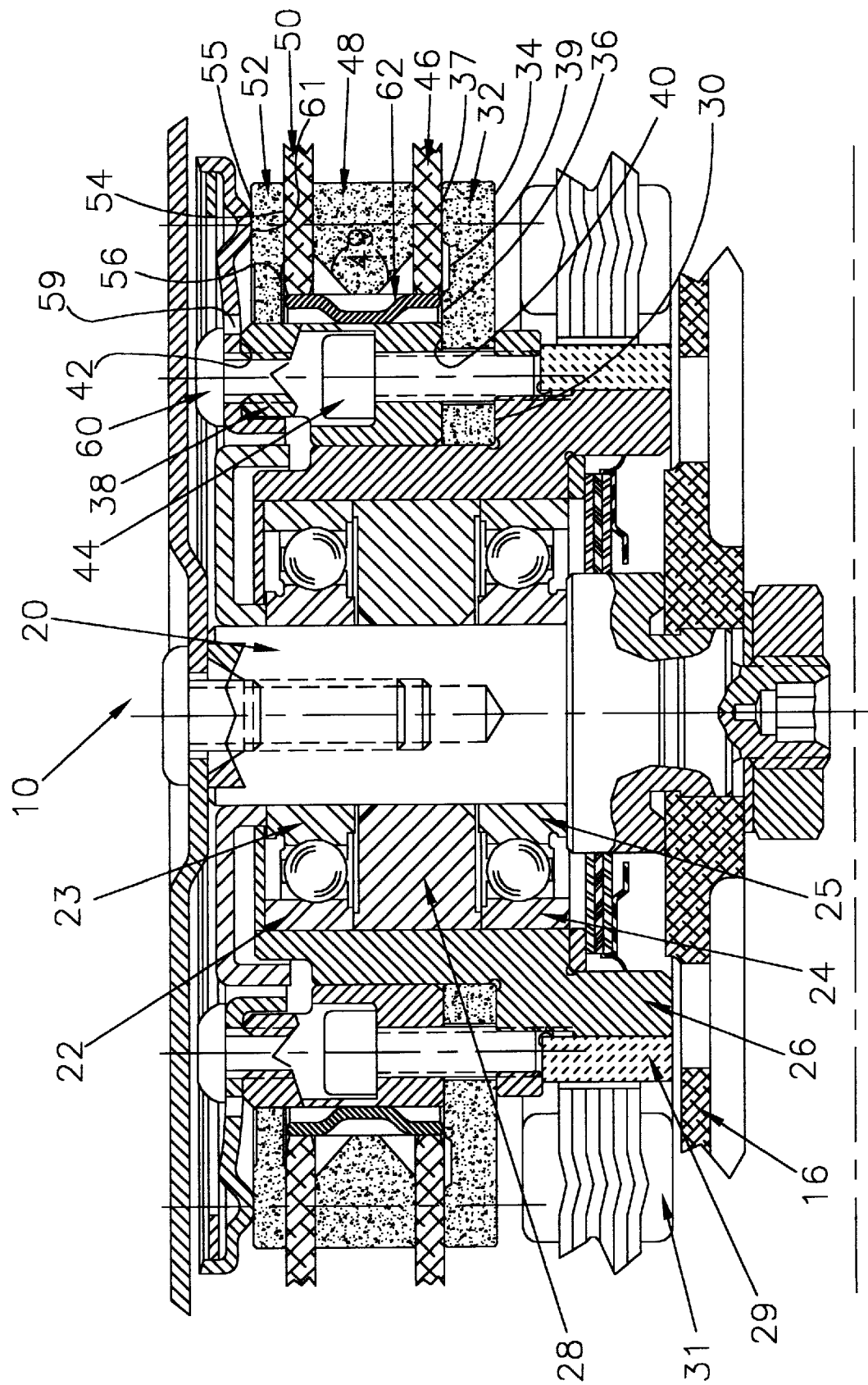
FIG. 1 is an exploded fragmented elevational sectional view through a disc drive unit showing an assembly of spindle motor and disc stack with hub flange, disc spacer and the clamp washer of the present invention.

With reference to FIG. 1, a central shaft 20 is securely fixed to a portion of the housing lower base 16, and first disc 46 and second disc 50 are mounted for rotational movement within the housing 16 about the shaft 20. Central shaft 20 is also attached to the inner races of upper bearing and lower bearing.

The outer race of the upper bearing 22 and the outer race of the lower bearing 24 support a generally cylindrical hub core 26 constituting the rotor of the spindle motor. A spacer ring 28 having an inner diameter larger than the diameter of the central shaft and an outer diameter substantially equal to the diameter of the upper bearing and the lower bearing is placed between the upper bearing and the lower bearing while maintaining an operating gap between the spacer ring 28 and the central shaft 20. The spacer ring 28 further having a raised surface near its periphery, so that the outer races of the upper bearing 22 and the lower bearing 24 rest upon the raised surface while maintaining an operating gap between the spacer ring 28 and the inner race of the upper bearing 23 and the inner race of the lower bearing 25.

The hub core 26 supports, at its lower end, a plurality of permanent magnets 29 which interact with an electro-magnetic stator core 31 to rotate the hub core 26 about the center shaft 20 in a known manner.

The hub core near the lower end, has an outer shoulder 30. A hub flange 32 made up of ceramic material having a lower surface 34 and an upper surface 36, with the lower surface 34 resting upon the outer shoulder 30 of the hub core 26, while the upper surface 36 having a raised surface 37 near the periphery of the hub flange 32 and a recess 39 near the middle of the hub flange 32.

A spacer hub 38 having a lower surface 40 and an upper surface 42 with the lower surface 40 of the spacer hub 38 resting on the upper surface 36 of the hub flange 32 while a plurality of bolts 44 passing through the spacer hub 38 fasten the spacer hub 38 and the ceramic hub flange 32 to the outer shoulder 30 of the hub core 26. A conductive centering sleeve 62 is inserted over the spacer hub 38. The conductive centering sleeve 62 further having an outer surface and an inner surface.

A first disc 46 with a stamped inner hole is stacked on top of the hub flange 32, resting on the raised surface 37 of the upper surface 36 of the hub flange 32. The raised surface 37 prevents contact between the hub flange 32 and any residual distortion present near the inner hole of the first disc 46. A disc spacer 48 is stacked on top of the first disc 46 and a second disc 50 is stacked on top of the disc spacer 48. Portions of the outer surface of the centering sleeve 62 exert a radial force upon the first disc 46 and the second disc 50, positioning them concentric while establishing an electrically conductive contact with the first disc 46 and the second disc 50. Portions of the inner surface of the conductive centering sleeve 62 touches the outer surface of the spacer hub 38 and establishes conductive path. By electrically grounding the spacer hub 38 and thus providing an electrical path to the first disc 46 and the second disc 50, the first disc 46 and the second disc 50 are maintained at ground potential, thereby avoiding the buildup of static electricity. The corners 49 of the inner portion of the disc spacer 48 are relieved, thus preventing a distorted section of the first disc 46 and the second disc 50 from contacting the disc spacer 48. A clamp washer 52 having a lower raised surface 54 near the periphery is stacked on top of the second disc 50. The inner portion 56 of the clamp washer 52 is relieved preventing the distorted section of the second disc 50 from contacting the clamp washer 52. A clamp spring 58 with resilient inner portion 59 connected to the upper surface 42 of the spacer hub via a plurality of bolts 60 and a formed outer portion 61 rest on the upper raised surface 55 of the clamp washer 52. By appropriately tightening the bolts 60, a clamp force is applied to the disc and spacer stack, substantially along an axis connecting said raised portions of said clamp washer 52 and said raised portion of said hub flange 32.

Figure 2A:
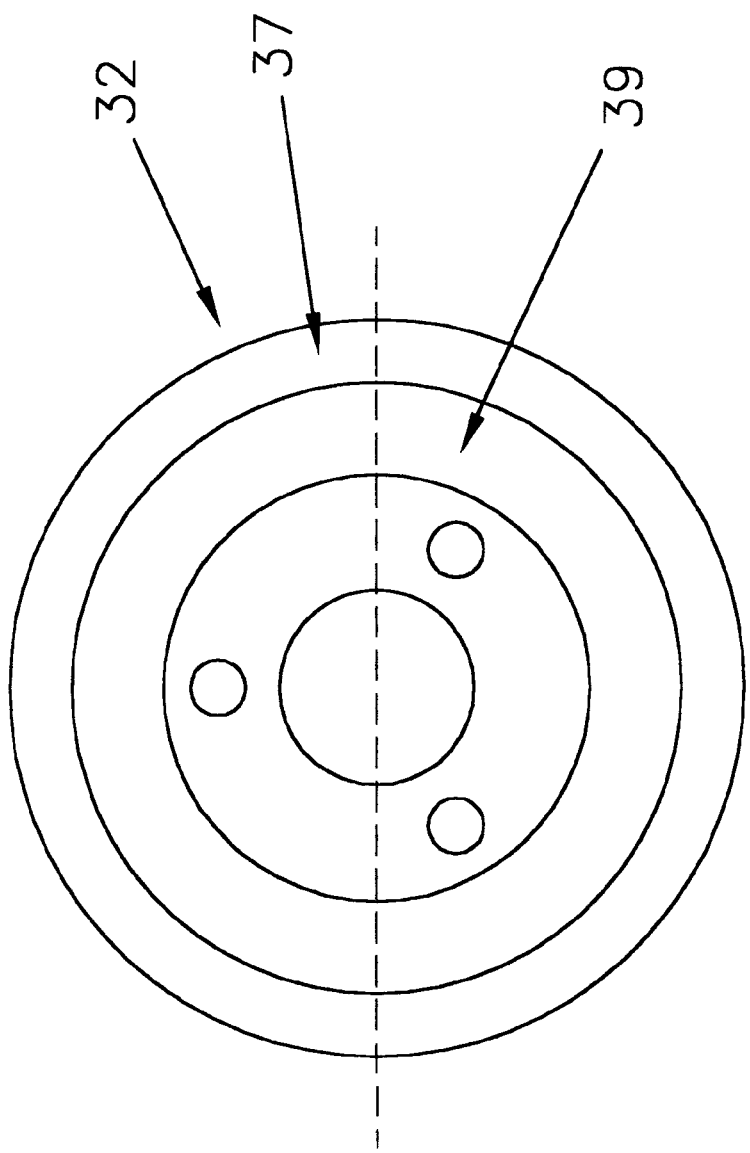
FIGS. 2a and 2b are plan and sectional elevation views respectively, showing the hub flange of the present invention.
Figure 2B:
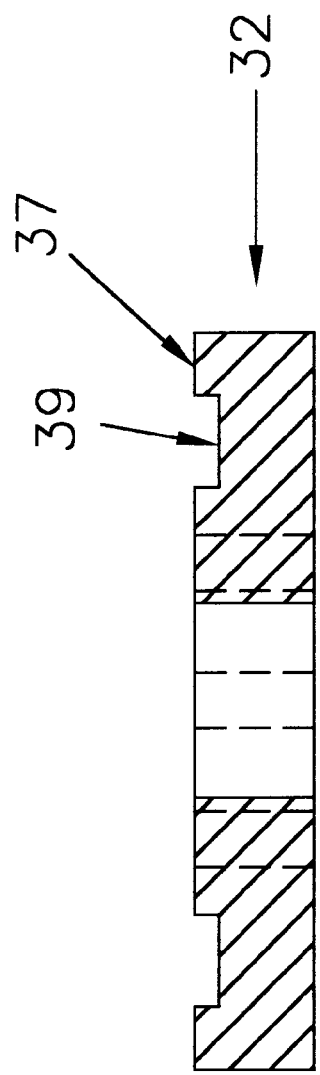

FIGS. 2a and 2b are plan and sectional elevation views respectively, of the hub flange 32 of the present invention. FIGS. 2a and 2b further show the upper surface 36 having a raised surface 37 near the periphery and a recess 39 near the middle of the hub flange 32.

Figure 3A:
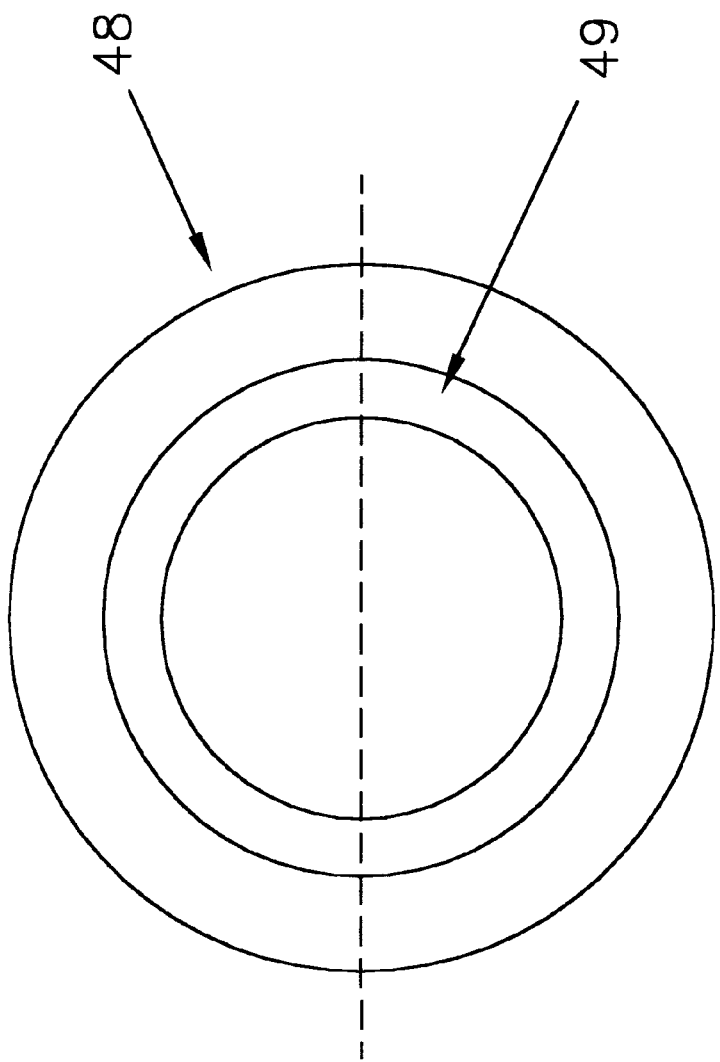
FIGS. 3a and 3b are plan and sectional elevation views respectively, showing the disc spacer of the present invention.
Figure 3B:
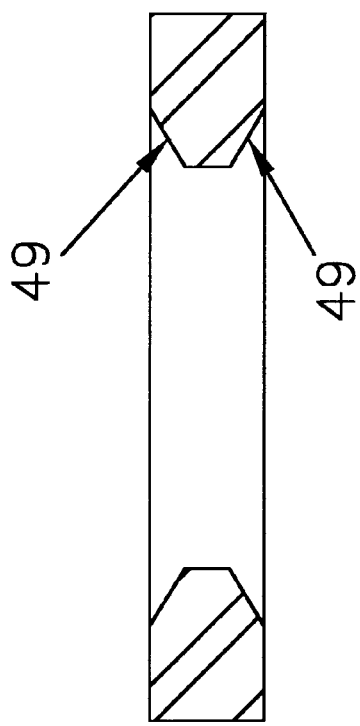

FIGS. 3a and 3b are the plan and sectional elevation views respectively, of the disc spacer 48, clearly showing the relief 49 around the corners of the inner diameter.

Figure 4A:
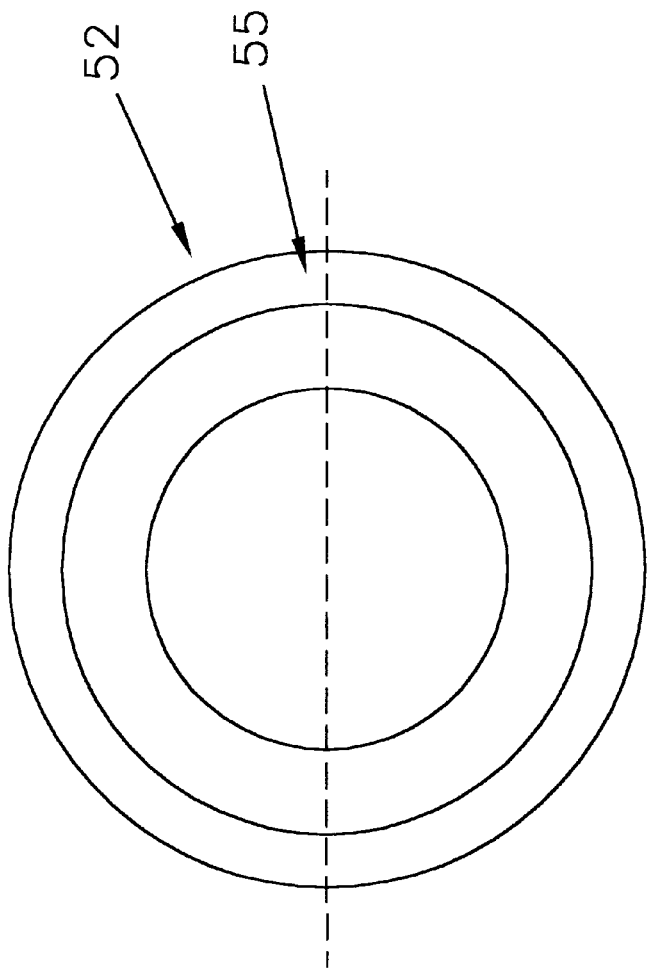
FIGS. 4a and 4b are plan and sectional elevation views respectively, showing the clamp washer of the present invention.
Figure 4B:
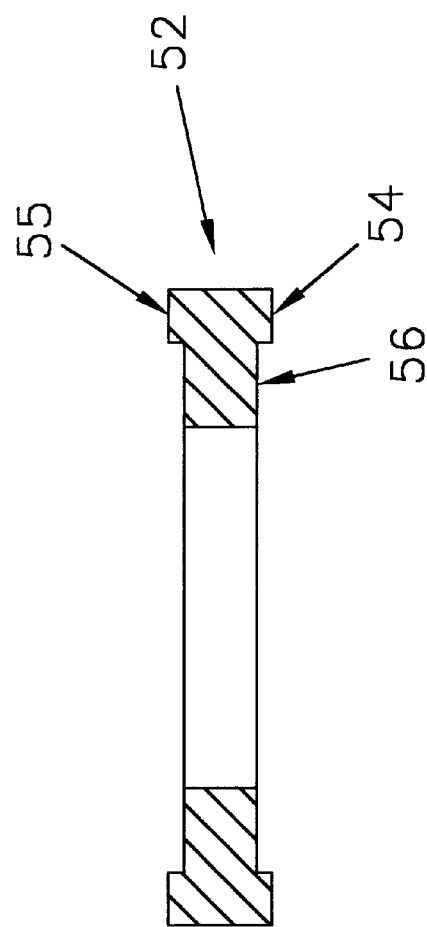

FIGS. 4a and 4b are the plan and sectional elevation views respectively, of the clamp washer 52, clearly showing the lower raised surface 54 and upper raised surface 55 near the periphery and the relieved inner portion 56.

The preferred embodiment discloses a disc drive motor utilizing novel hub flange, disc spacer and the clamp washer of the present invention. The present invention can be practiced by using the novel hub flange, disc spacer and the clamp washer either singularly or in any combination. Further, the invention can be practiced in a disc drive with a single disc, without the use of novel disc spacer.

From the above description, it is apparent that many modifications and variations of the present invention are possible in light of the above teachings. It is therefore to be understood that, within the scope of the appended claims, the invention may be practiced otherwise than as specifically described hereinabove.

We claim:

1. A disc drive motor spindle hub assembly comprising:
   a hub core rotatably attached to a disc drive motor;
   a ceramic hub flange formed independently of said hub core;
   a first disc resting against said hub flange and spaced from an outermost peripheral surface of said hub core;
   means for attaching said ceramic hub flange to said hub core;
   clamping means including a clamp washer, said clamp washer working cooperatively with said ceramic hub flange for applying a clamp force to said first disc; and electrically conductive centering means for exerting a radial force to said first disc and for electrically connecting said first disc to said hub core.

2. A disc drive motor spindle hub assembly as claimed in claim 1 wherein said clamp washer is made of ceramic material.

3. A disc drive motor spindle hub assembly as claimed in claim 1 wherein said electrically conductive centering means includes an electrically conductive centering sleeve disposed between said hub core and said first disc, and electrically connecting said hub core and said first disc.

4. A disc drive motor spindle hub assembly as claimed in claim 1 wherein said means for attaching said ceramic hub flange includes:
   a hub spacer, said hub spacer having a lower surface, said lower surface resting on the upper surface of said ceramic hub flange; and
   a plurality of bolts connecting said hub spacer to said hub core.

5. A disc drive motor spindle hub assembly as claimed in claim 1 wherein said clamping means includes:
   a hub spacer, said hub spacer having an upper surface;
   a clamp spring, said clamp spring having a resilient inner portion and a formed outer portion, said formed outer portion resting on said clamp washer; and
   a plurality of bolts connecting said inner portion of said clamp spring to said upper surface of said hub spacer.

6. A disc drive motor spindle hub assembly as claimed in claim 1 wherein said ceramic hub flange has a peripherally raised area.

7. A disc drive motor spindle hub assembly as claimed in claim 1 wherein said ceramic hub flange has a flat peripherally raised area.

8. A disc drive motor spindle hub assembly as claimed in claim 1 wherein the lower surface of said clamp washer has a lower raised surface near the periphery of said clamp washer.

9. A disc drive motor spindle hub assembly as claimed in claim 1 wherein the upper surface of said clamp washer has an upper raised surface near the periphery of said clamp washer.

10. A disc drive motor spindle hub assembly as claimed in claim 1 wherein said clamp washer has an inner portion, said inner portion being relieved.

11. A disc drive motor spindle hub assembly as claimed in claim 1 further including at least a second disc and a disc spacer, said disc spacer and said second disc alternatively stacked upon said first disc to form a disc and spacer stack and said clamping means applying clamp force to said disc and spacer stack.

12. A disc drive motor spindle hub assembly as claimed in claim 11 wherein said disc spacer is made of ceramic material.

13. A disc drive motor spindle hub assembly as claimed in claim 11 wherein said electrically conductive centering means includes an electrically conductive centering sleeve disposed between said hub core and said first disc and said second disc, and electrically connecting said hub core to said first disc and said second disc.

14. A disc drive motor spindle hub assembly as claimed in claim 11 wherein said disc spacer has an inner portion, said inner portion being relieved.

15. A disc drive comprising:
   a spindle hub having:
      a hub core rotatably attached to a disc drive spindle motor;
      a ceramic hub flange formed independently of said hub core;
      a first disc resting against said hub flange and spaced from an outermost peripheral surface of said hub core;
      means for attaching said hub flange to said hub core;
      clamping means including a clamp washer, said clamp washer working cooperatively with said hub flange for applying a clamp force to said first disc; and
      electrically conductive centering means for exerting a radial force to said first disc and for electrically connecting said first disc to said hub core.

16. A disc drive as claimed in claim 15 wherein said clamp washer is made of ceramic material.

17. A disc drive as claimed in claim 15 wherein said electrically conductive centering means includes an electrically conductive centering sleeve disposed between said hub core and said first disc, and electrically connecting said hub core and said first disc.

18. A disc drive as claimed in claim 15 further including at least a second disc and a disc spacer, said disc spacer and said second disc alternatively stacked upon said first disc to form a disc and spacer stack, said electrically conductive centering means disposed between said hub core and said first disc and said second disc, and electrically connecting said first disc and said second disc in said disc and spacer stack to said hub core and said clamping means applying clamp force to said disc and spacer stack.

19. A disc drive as claimed in claim 18 wherein said disc spacer is made of ceramic material.

20. A disc drive motor spindle hub assembly comprising:
   a hub core rotatably attached to a disc drive motor;
   a ceramic hub flange formed independently of said hub core;
   a first disc resting against said hub flange and spaced from an outermost peripheral surface of said hub core;
   means for attaching said hub flange to said hub core and including a hub spacer, said hub spacer having an upper surface and said hub spacer connected to said hub core;
   electrically conductive centering means for exerting a radial force to said first disc and for electrically connecting said first disc to said hub core; and
   clamping means including:
      a ceramic clamp washer, an upper surface of said ceramic clamp washer having an upper raised surface and a lower surface of said ceramic clamp washer having a lower raised surface, said lower surface of said ceramic clamp washer resting on the upper side of said first disc;
      a clamp spring, said clamp spring having a resilient inner portion and a formed outer portion, said formed outer portion resting on said upper raised surface of said ceramic clamp washer; and
      a plurality of bolts connecting said inner portion of said clamp spring to said upper surface of said hub spacer, said clamp spring and said ceramic clamp washer working cooperatively with said hub flange for applying a clamp force to said first disc.

21. A disc drive motor spindle hub assembly as claimed in claim 20 wherein said electrically conductive centering means includes an electrically conductive centering sleeve disposed between said hub core and said first disc, and electrically connecting said hub core and said first disc.

22. A disc drive motor spindle hub assembly as claimed in claim 20 wherein said hub spacer has a lower surface, said lower surface of said hub spacer resting on the upper surface of said hub flange and a plurality of bolts connecting said hub spacer to said hub core.

23. A disc drive motor spindle hub assembly as claimed in claim 20 wherein said hub flange has a peripherally raised area.

24. A disc drive motor spindle hub assembly as claimed in claim 20 wherein said hub flange has a flat peripherally raised area.

25. A disc drive motor spindle hub assembly as claimed in claim 20 wherein said ceramic clamp washer has an inner portion, said inner portion being relieved.

26. A disc drive motor spindle hub assembly as claimed in claim 20 further including at least a second disc and a disc spacer, said disc spacer and said second disc alternatively stacked upon said first disc to form a disc and spacer stack and said clamping means applying clamp force to said disc and spacer stack.

27. A disc drive motor spindle hub assembly as claimed in claim 26 wherein said electrically conductive centering means includes an electrically conductive centering sleeve disposed between said hub core and said first disc and said second disc, and electrically connecting said hub core to said first disc and said second disc.

28. A disc drive motor spindle hub assembly as claimed in claim 26 wherein said disc spacer has an inner portion, said inner portion of said disc spacer being relieved.

* * * * *